United States Patent

Matsumoto et al.

Patent Number: 5,251,430
Date of Patent: Oct. 12, 1993

[54] CUTTER AND HOUSING ASSEMBLY FOR LAWN MOWER

[75] Inventors: Naoki Matsumoto, Saitama; Naoki Kinoshita, Tokyo, both of Japan

[73] Assignee: Honda Giken Kogyo Kabushiki Kaisha, Tokyo, Japan

[21] Appl. No.: 565,795

[22] Filed: Aug. 10, 1990

[51] Int. Cl.$^5$ .............................................. A01D 34/66
[52] U.S. Cl. .......................................... 56/17.5; 56/255; 56/320.2; 56/DIG. 20
[58] Field of Search .................... 56/17.4, 17.5, 255, 56/295, 6, 320.1, 320.2, DIG. 9, DIG. 20, DIG. 22, DIG. 24

[56] References Cited

U.S. PATENT DOCUMENTS

| | | | |
|---|---|---|---|
| 3,038,288 | 7/1958 | Deptula et al. | |
| 3,795,094 | 3/1974 | Mollen et al. | 56/11.1 |
| 3,916,606 | 11/1975 | Brudnak, Jr. et al. | 56/DIG. 22 |
| 4,226,074 | 10/1980 | Mullet et al. | 56/320.2 |
| 4,232,505 | 11/1980 | Walto | 56/12.7 |
| 4,472,926 | 9/1984 | Siegrist et al. | 56/13.6 |
| 4,679,382 | 7/1987 | Saruhashi et al. | 56/10.1 |
| 4,716,717 | 1/1988 | Ogano et al. | 56/255 |
| 4,771,077 | 12/1987 | Kutsukake et al. | 56/320.2 |
| 4,817,372 | 4/1989 | Toda et al. | 56/12.8 |
| 4,958,484 | 9/1990 | Busboom | 56/6 |

FOREIGN PATENT DOCUMENTS

| | | |
|---|---|---|
| 3419358 | 5/1984 | Fed. Rep. of Germany . |
| 2470524 | 11/1980 | France . |
| 9102906 | 7/1992 | France . |
| 61-74323 | 5/1986 | Japan . |
| 61-98424 | 6/1986 | Japan . |
| 64-10913 | 1/1989 | Japan . |
| 64-6681 | 2/1989 | Japan . |
| 1090081 | 10/1965 | United Kingdom . |
| 1378527 | 10/1972 | United Kingdom . |
| 1530354 | 3/1976 | United Kingdom . |
| 2162734 | 2/1986 | United Kingdom . |

Primary Examiner—6
Assistant Examiner—Terry Lee Melius
Attorney, Agent, or Firm—Irving M. Weiner; Joseph P. Carrier; Pamela S. Burt

[57] ABSTRACT

A cutter and housing assembly for a lawn mower has a cutter having a plurality of blades disposed dispersely as viewed in plan, and a cutter housing accommodating the cutter therein and having at least an upper panel and a side grass clipping discharge outlet. The upper panel has an elevated panel portion which defines a grass clipping discharge passage. The elevated panel portion is spaced from lower ends of the blades by a distance ranging from 120 mm to 140 mm, and is higher than the upper panel by a distance ranging from 0 mm to 20 mm.

29 Claims, 6 Drawing Sheets

CUTTER AND HOUSING ASSEMBLY FOR LAWN MOWER

BACKGROUND OF THE INVENTION

1. Field of the Invention

The present invention relates to a cutter and housing assembly for a lawn mower.

2. Description of the Relevant Art

Lawn mowers have cutter housings below lawn mower vehicle bodies. In a riding-type lawn mower, particularly, a plurality of cutter blades are usually disposed dispersely or at spaced positions in a cutter housing. The cutter housing has a grass clipping discharge outlet defined in a side portion thereof and a grass clipping discharge passage defined in a front portion thereof and communicating with the grass clipping outlet. As shown in Japanese Laid-Open Utility Model Publication No. 61(1986)-98424, the grass clipping discharge passage is defined above an upper surface of the cutter housing.

In operation, grass clippings cut off by the cutter blades are discharged laterally of the lawn mower through the grass clipping discharge passage and the grass clipping discharge outlet.

When lawn grass is clipped by a lawn mower, it is desirable that the clipped lawn surface be uniformly even. However, the conventional lawn mowers tend to leave some grass uncut and hence leave the clipped lawn surface irregular, so that the lawn may not have a desired neat appearance.

The present invention has been made in an effort to effectively solve the aforesaid problems of the conventional lawn mowers.

SUMMARY OF THE INVENTION

It is an object of the present invention to provide a cutter and housing assembly for a lawn mower, which can clip lawn grass to a uniformly even surface for a neat lawn appearance and which can discharge grass clippings effectively.

According to the present invention, there is provided a cutter and housing assembly for a lawn mower, comprising means for cutting including a plurality of blades disposed dispersely as viewed in plan, and a cutter housing accommodating the cutting means therein and having at least an upper panel and a side grass clipping discharge outlet. The upper panel has an elevated panel portion which defines within the cutter housing a grass clipping discharge passage positioned forwardly, with respect to the lawn mower, of paths of rotational motion of the blades and contiguous to the grass clipping discharge outlet. The elevated panel portion is spaced from lower ends of the blades by a distance ranging from 120 mm to 140 mm, and the elevated panel portion is higher than the upper panel by a distance ranging from 0 mm to 20 mm.

According to the present invention, there is also provided a cutter and housing assembly for a lawn mower, comprising means for cutting including a single center blade and two side blades disposed one on each side of the center blade, and a cutting means housing accommodating the cutter therein and having at least an upper panel and a side grass clipping discharge outlet. The upper panel has an elevated panel portion which defines within the cutter housing, a grass clipping discharge passage positioned forwardly, with respect to the lawn mower, of paths of rotational motion of the blades and contiguous to the grass clipping discharge outlet, and the cutter housing has a rear panel, a side panel joined to the rear panel, and a front panel joined to the side panel. One of the side blades which is positioned remotely from the grass clipping discharge outlet has a path of rotational motion which is spaced from the rear panel, the side panel, and the front panel by respective distances which are progressively larger along the direction in which the one side bade rotates, whereby an upstream portion of the grass clipping discharge passage around the one side blade is of a scroll shape.

According to the present invention, there is further provided a cutter and housing assembly for a lawn mower, comprising means for cutting including a plurality of blades disposed dispersely as viewed in plan, and a cutter housing accommodating the cutting means therein and having at least an upper panel and a side grass clipping discharge outlet. The upper panel has an elevated panel portion which defines within the cutter housing a grass clipping discharge passage positioned forwardly, with respect to the lawn mower, of paths of rotational motion of the blades and contiguous to the grass clipping discharge outlet. One of the side blades which is positioned closely to the grass clipping discharge outlet, is being rotatable at a speed higher than speeds at which the other blades rotate.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

As shown in FIGS. 1 through 4, a riding-type lawn mower 100 has a cutter and housing assembly including a cutter 80 and a cutter housing 22 according to the present invention.

Figure 1:
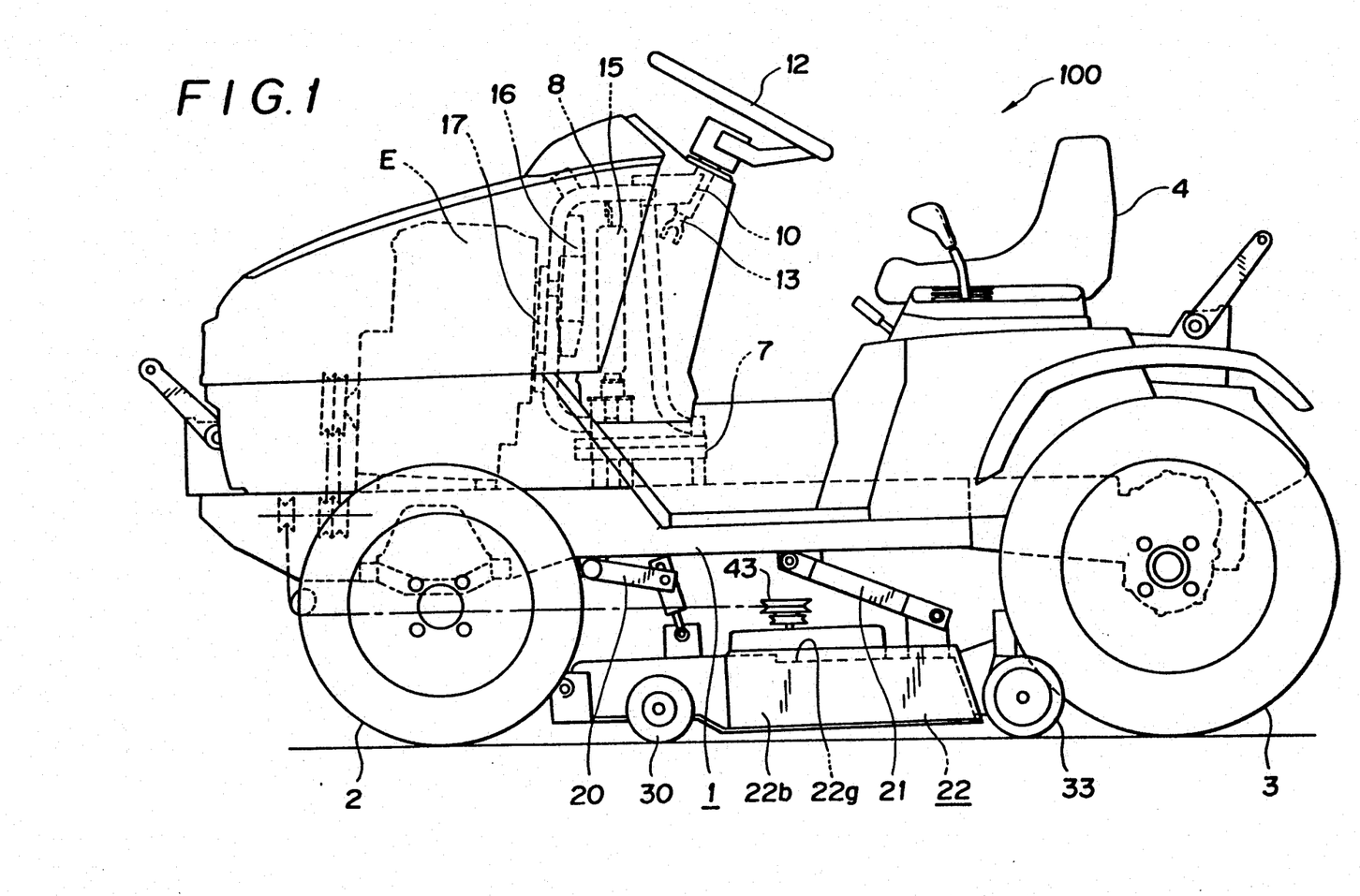
FIG. 1 is a side elevational view of a riding-type lawn mower having a cutter and housing assembly according to a preferred embodiment of the present invention.

The lawn mower 100 comprises a vehicle frame 1, front wheels 2 rotatably mounted on the vehicle frame 1, rear wheels 3 rotatably mounted on the vehicle frame 1, a rider's seat 4 supported on the vehicle frame 1, and an engine E mounted on the vehicle frame 1. The vehicle frame 1 also supports thereon a steering gearbox 7 with a support frame 8 mounted thereon. A steering shaft 13 with a steering wheel 12 on its upper end is inserted through a support pipe 10 which is fixed to the rear end of the support frame 8.

A radiator 15 and a cooling fan 16 are disposed within the support frame 8. The cooling fan 16 can be operated by the engine E through a belt and pulley mechanism 17.

The cutter housing 22 is vertically adjustably connected to the lower surface of the vehicle frame 1 through links 20, 21. In the illustrated embodiment, the cutter housing 22 is slightly tilted forwardly at about 1° with respect to the horizontal plane as shown in FIG. 1.

Figure 2:
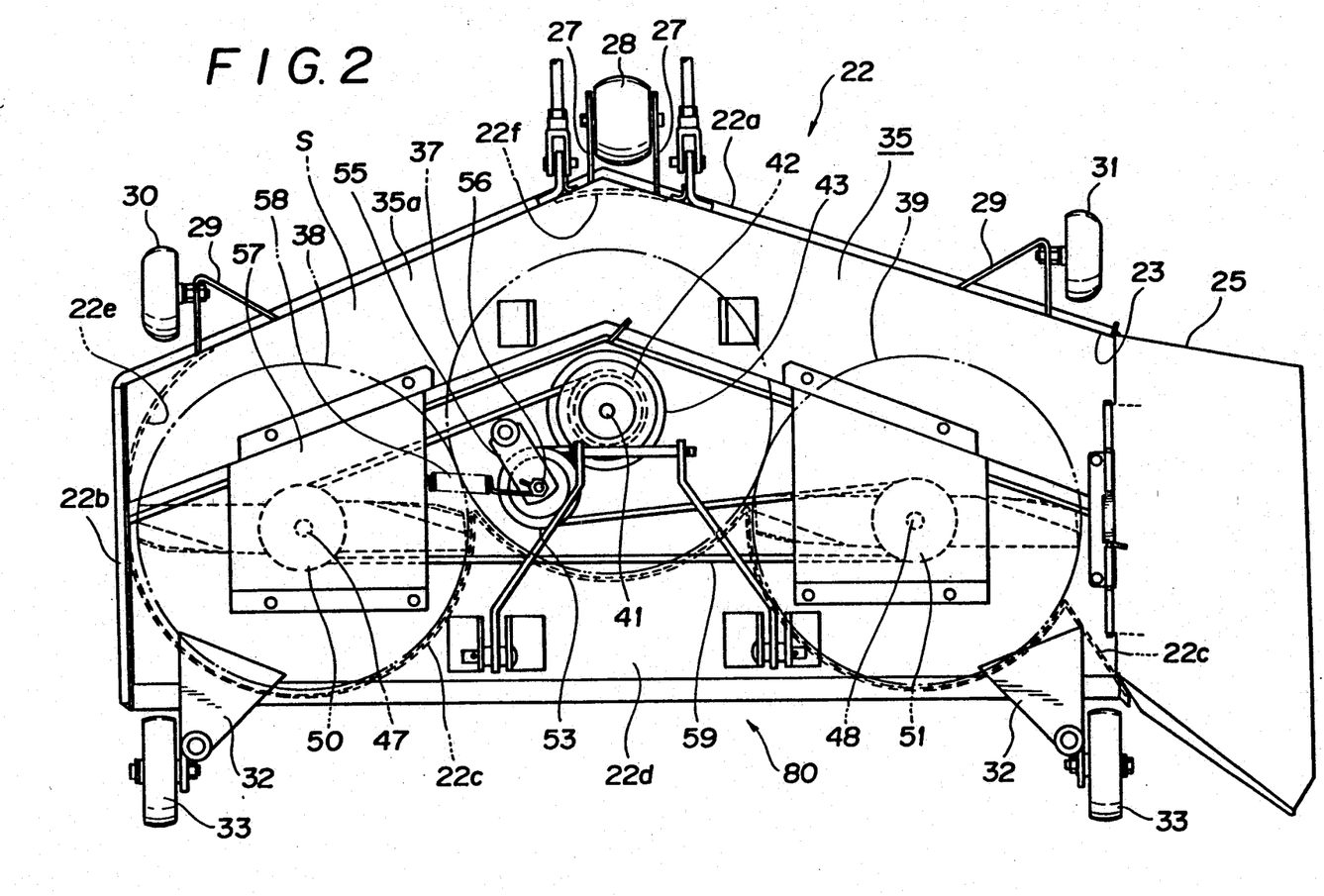
FIG. 2 is a plan view of a cutter housing of the cutter and housing assembly.
Figure 3:
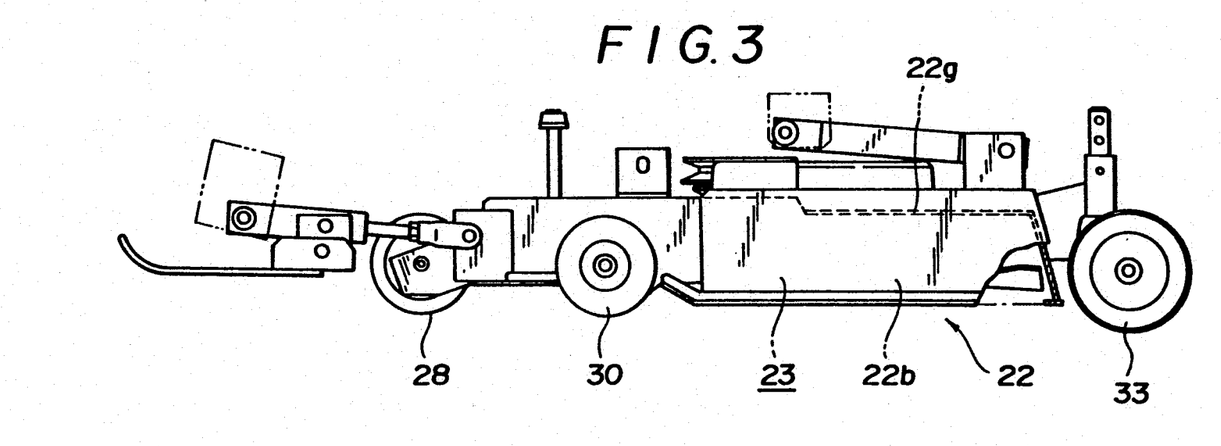
FIG. 3 is a side elevational view of the cutter housing.

As shown in FIG. 2, the cutter housing 22 comprises a front panel 22a angularly projecting or bulging forwardly (with respect to the lawn mower 100) at its center, a side panel 22b extending rearwardly (with respect to the lawn mower 100) from the lefthand end of the front panel 22a, a rear panel 22c having a side end joined to the rear end of the side panel 22b and having a shape complementary to the rear edges of circular paths of cutter blades (described later), a flange 22d extending rearwardly from the lower edge of the rear panel 22c, a first corner 22e lying between the front panel 22a and the side panel 22b, a second corner 22f disposed in the projecting center of the front panel 22a, and an upper panel 22g (see FIGS. 1 and 3) disposed on the upper edges of the front panel 22a, the side panel 22b, and the rear panel 22c. The front panel 22a, the side panel 22b, the rear panel 22c, the first corner 22e, the second corner 22f, and the upper panel 22g jointly define a space S within the cutter housing 22.

Figures 5, 6:
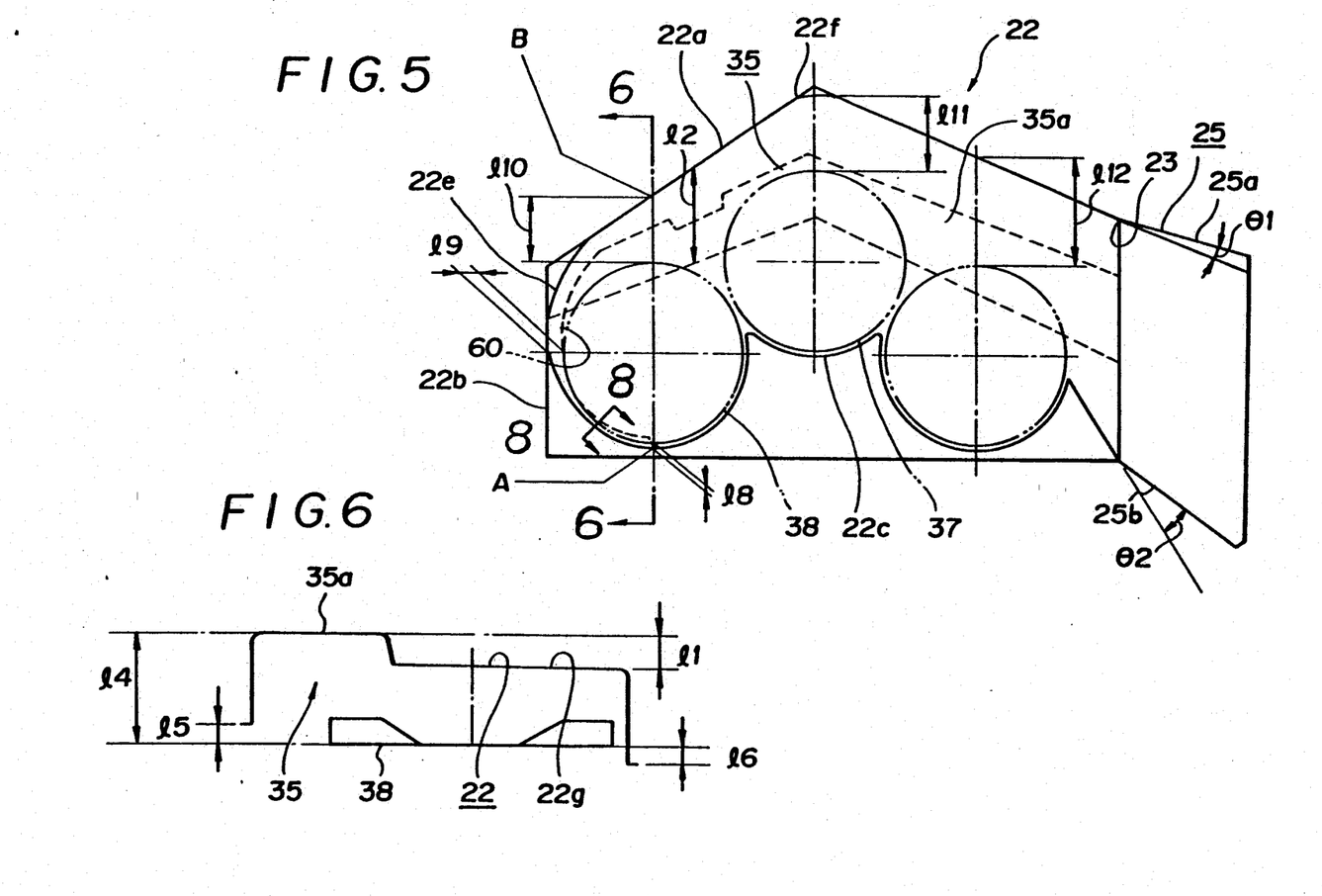
FIG. 5 is a schematic plan view of the cutter housing.
FIG. 6 is a cross-sectional view taken along line 6—6 of FIG. 5.

The cutter housing 22 has a grass clipping discharge outlet 23 defined in its righthand side, and a discharge adapter 25 is mounted in the grass clipping discharge outlet 23. The discharge adapter 25 has a width (extending vertically in FIG. 2) which is progressively greater in the outward direction (rightward in FIG. 2), i.e., in the downstream direction along which grass clippings are discharged from within the cutter housing 22 laterally of lawn mower 100. As shown in FIG. 5, the discharge adapter 25 has a front wall 25a which is inclined with respect to the front panel 22a of the cutter housing 22 at an angle $\theta 1$ of about 8°, and a rear wall 25b which is inclined with respect to the rear panel 22c of the cutter housing 22 at an angle $\theta 2$ of about 18°.

A front center wheel 28 is rotatably mounted on the center of the front panel 22a by brackets 27. Left and right side wheels 30, 31 are also mounted on the front panel 22a at laterally spaced positions by respective brackets 29. Left and rear rear wheels 33 are mounted on a rear portion of the cutter housing 22 by respective brackets 32.

The upper panel 22g has, on its front portion, an elevated panel portion 35a which defines a grass clipping discharge passage 35 (see FIGS. 5 and 6) in the cutter housing 22, the grass clipping discharge passage 35 communicating with the grass clipping discharge outlet 23. The elevated panel portion 35a is positioned upwardly of the upper panel 22g by a distance l1 (FIG. 6) ranging from 0 to 20 mm. The grass clipping discharge passage 35 has a width l2 (vertically in FIG. 5) along the longitudinal axis of the lawn mower 100, the width l2 being progressively larger in the downstream direction along which grass clippings are discharged. The grass clipping discharge passage 35 angularly projects forwardly at its center.

The cutter 80 is positioned within the cutter housing 22. The cutter 80 comprises a center blade 37, a lefthand side blade 38, and a righthand side blade 39, the blades 37, 38, 39 being dispersely positioned as viewed in plan. The lefthand side blade 38 is positioned remotely from the grass clipping discharge outlet 23, and the righthand side blade 39 is positioned closely to the grass clipping discharge outlet 23. Each of the blades 37, 38, 39 is twisted to a height l3 (FIG. 4) of 30 mm, and doubles as a fan for generating air streams to discharge grass clippings. As shown in FIG. 6, the lower end of the lefthand side blade 38 and the elevated panel portion 35a which defines the grass clipping discharge passage 35 are vertically spaced from each other by a distance l4 ranging from 120 to 140 mm. The lower end of the front portion of the cutter housing 22 and the lower end of the side blade 38 are vertically spaced from each other by a distance l5 of 7 mm. The lower end of the rear portion of the cutter housing 22 and the lower end of the side blade 38 are vertically spaced from each other by a distance l6 of 15 mm. The grass clipping discharge passage 35 is positioned forwardly of the paths of rotational motion of the blades 37, 38, 39.

Figure 4:
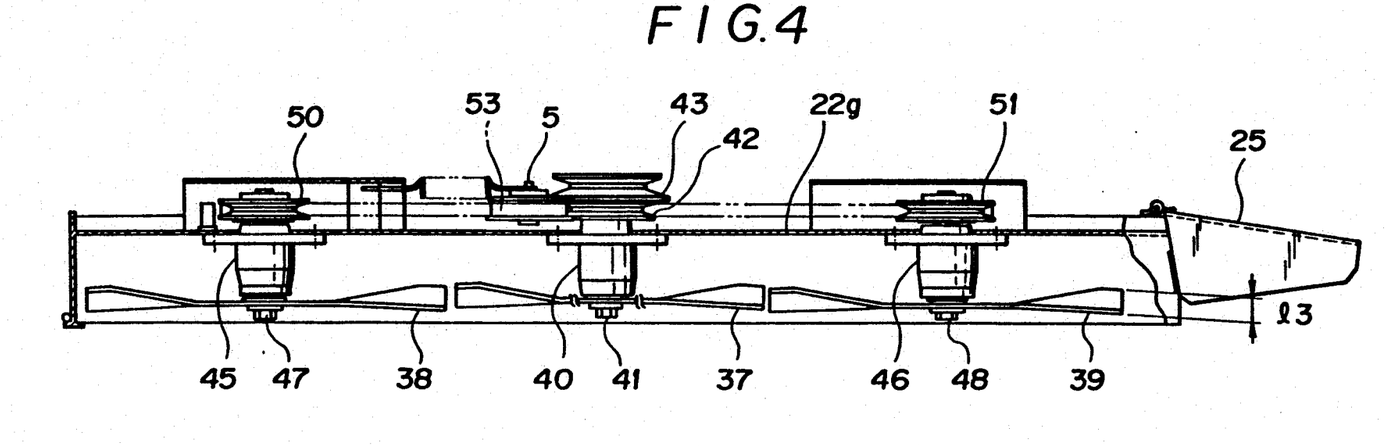
FIG. 4 is a vertical cross-sectional view of the cutter housing.

The center blade 37 is positioned centrally in the cutter housing 22, and the side blades 38, 39 are positioned on the lefthand and righthand sides, respectively, of and also rearwardly of the center blade 37. As illustrated in FIG. 4, the center blade 37 is higher than the side blades 38, 39 by about 2.5 mm.

Figure 7:
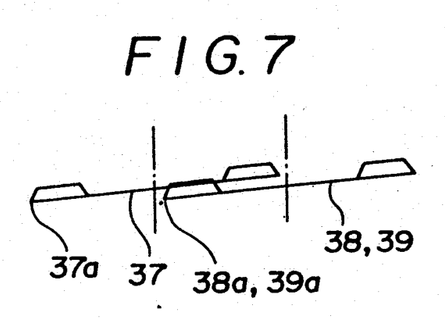
FIG. 7 is a schematic side elevational view of center and side blades in the cutter housing.

As shown in FIG. 4, the center blade 37 is mounted on the lower end of a shaft 41 which is rotatably supported in a support bushing 40 that is fastened to the upper panel 22g. A pulley 42 is fixed to an upper end portion of the shaft 41, and another pulley 43 is also fixed to the upper end portion of the shaft 41 above the pulley 42. Likewise, the side blades 38, 39 are mounted on the lower ends of shafts 47, 48, respectively, which are rotatably supported in respective support bushings 45, 46 that are fastened to the upper panel 22g. Pulleys 50, 51 are fixed to upper end portions, respectively, of the shafts 47, 48. Since the cutter housing 22 is tilted forwardly, the center blade 37 and the side blades 38, 39 are also tilted forwardly (to the left) as shown in FIG. 7 such that a front tip 37a of the center blade 37 and front tips 38a, 39a of the side blades 38, 39 are held in the same vertical position. The forward inclination of the center blade 37 and the side blades 38, 39 is effective to reduce the amount of power which is required to clip lawn grass by the lawn mower 100.

As shown in FIG. 2, a tension pulley 53 is disposed behind the pulley 42 connected to the center blade 37. The tension pulley 53 is rotatably supported by a shaft 56 on a bracket 55 which is swingably supported on the cutter housing 22. A spring 58 acts between the shaft 56 and a bracket 57 fixed to the cutter housing 22.

A V-belt 59 is trained around the pulleys 42, 50, 51 and the tension pulley 53. Another V-belt (see FIG. 1) is trained around the pulley 43 and a pulley which is operatively coupled to an output shaft of the engine E. Therefore, when the pulleys 43, 42 are rotated by the engine E, the rotation is transmitted to the pulleys 50, 51 by the V-belt 59 to rotate the center blade 37 and the side blades 38, 39 in the same direction (i.e., clockwise in FIG. 2). When the blades 37, 38, 39 are rotated, they cut off lawn grass, and grass clippings are discharged laterally of the lawn mower 100 through the grass clipping discharge passage 35, the grass clipping discharge outlet 23, and the discharge adapter 25.

The pulleys 42, 50 have the same outside diameter, and the outside diameter of the pulley 51 is smaller than the outside diameter of the pulleys 42, 50. Therefore, the lefthand side blade 38 and the center blade 37 rotate at the same speed, and the righthand side blade 39 rotates at a speed higher than the blades 38, 37. In the illustrated embodiment, the rotational speed of the righthand side blade 39 is 10 % higher than the rotational speed of the center blade 37 and the lefthand side blade 38. For example, the rotational speed of the lefthand side blade 38 and the center blade 37 is about 80 m/sec at their tip ends, i.e., about 3,350 r.p.m., and that of the righthand side blade 39 is about 88 m/sec at its tip end, i.e., about 3,690 r.p.m., where the while length or rotational diameter of each of the three blades 37,38 and 39 is about 456 mm. The former and latter rotational speeds may vary within the ranges of 3,000 to 3,400 r.p.m. and 3,100 to 3,700 r.p.m., respectively, as the case may be. Further, where the whole length of each of the blades 37,38 and 39 is about 530 mm, the rotational speeds of the former two and the last one are about 84m/sec and 88 m/sec, i.e., about 3,036 r.p.m and 3,181 r.p.m., respectively.

As shown in FIG. 5, the gap or clearance between the lefthand side blade 38 and the rear panel 22c, the side panel 22b, the first corner 22e, and the front panel 22a is progressively greater in the downstream direction along which grass clippings are discharged, so that the gap is of a scroll shape. More specifically, the gap is of a scroll shape from a point A to a point B in FIG. 5. The side blade 38 and the rear panel 22c are spaced from each other by a distance 18 of 5 mm. The side blade 38 and the side panel 22b are spaced from each other by a distance 19 of 21 mm. The side blade 38 and the front panel 22a are spaced from each other by a distance 110 of 68 mm. Therefore, the gap as defined by the distances 18, 19, 110 is progressively larger in the direction in which the lefthand side blade 38 rotates.

The center blade 37 and the second corner 22f are spaced from each other by a distance 111 which is greater than the distance 110 The righthand side blade 39 and the front panel 22a are spaced from each other by a distance 112 which is greater than the distance 111. Therefore, the gap referred to above is continuously scroll-shaped. Specifically, the distance 111 is 76 mm and the distance 112 is 110 mm in the illustrated embodiment.

Figure 8:
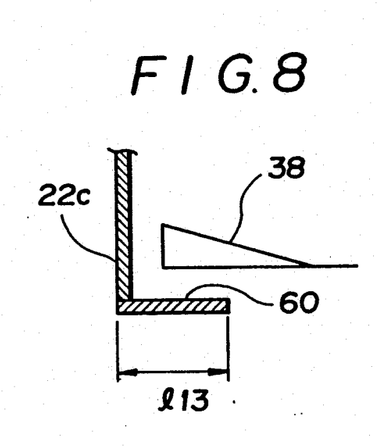
FIG. 8 is a cross-sectional view taken along line 8—8 of FIG. 5.

As shown in FIGS. 5 and 8, a flange 60 extending into the cutter housing 22 is attached to the lower end of the rear panel 22c. The flange 60 serves to prevent grass clippings from dropping while the grass clippings are flowing in the cutter housing 22. The flange 60 extends continuously from the point A on the rear panel 22c through the side panel 22b, the first corner 22e, the front panel 22a to the grass clipping discharge outlet 23. The flange 60 is progressively wider in the downstream direction along which grass clippings are discharged. The flange 60 has a width 113 of about 20 mm at a most upstream portion thereof as shown in FIG. 8.

The construction of the cutter 80 and the housing 22 in the lawn mower 100 offers the following advantages:

(1) Since the vertical distance 11 between the elevated panel portion 35a of the grass clipping discharge passage 35 and the upper panel 22g of the cutter housing 22 is selected to be 20 mm, and the vertical distance 14 between the lefthand or upstream side blade 38 and the elevated panel portion 35a is selected to be 120 mm, any grass which may be left uncut by the lawn mower 100 is reduced.

Figure 9:
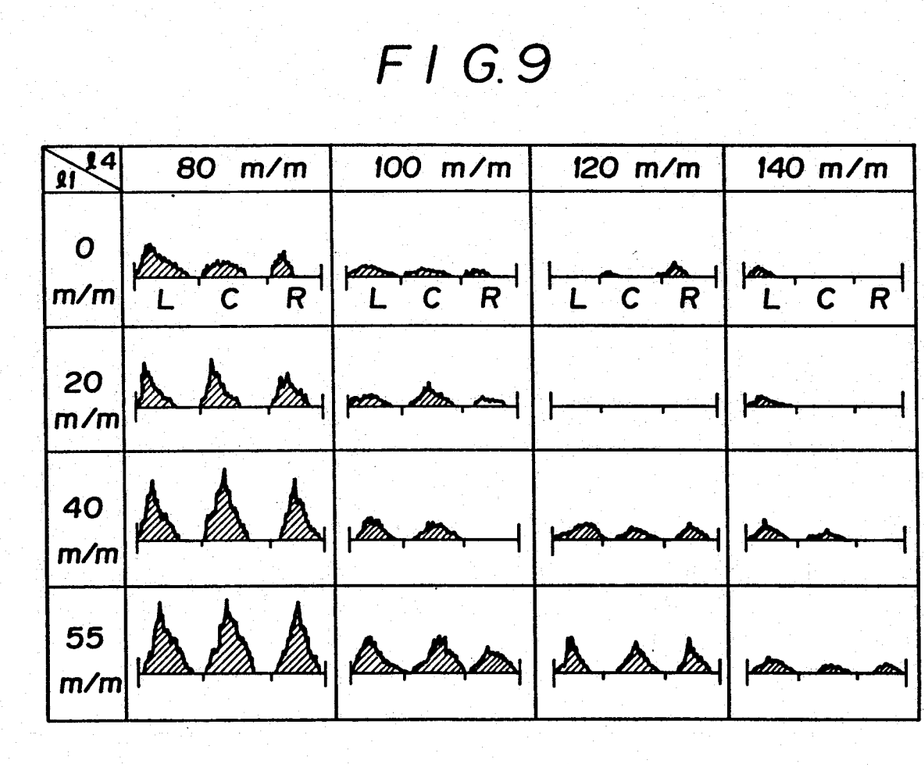
FIG. 9 is a table showing the relationship between dimensions of the cutter housing and lawn grass left uncut.

FIG. 9 is a table showing amounts of grass which remain uncut with respect to different dimensions of the distances 11, 14 in respective columns and rows. The amounts of grass which remain uncut are indicated in planes C, L, R normal to the paths of rotational motion of the center blade 37 and the side blades 38, 39.

The table clearly indicates that the distances 11, 14 should preferably be in the ranges of $0 \leq 11 \leq 20$ mm and $120 \leq 14 \leq 140$ mm, respectively. Particularly, the distance $11 = 20$ mm and the distance $14 = 120$ mm are optimum. Since the distances 11, 14 are selected to be of these optimum values in the illustrated embodiment, any grass which may remain uncut is substantially eliminated, and the clipped lawn surface is made even.

(2) It is known that the clipped lawn surface configuration is rendered better if the vertical distance 15 between the lower end of the front portion of the cutter housing 22 and the lower end of the upstream side blade 38 is larger. However, if the dimension 15 were too large, then the amount of air drawn into the cutter housing 22 would become insufficient. In the illustrated embodiment, the distance 15 is selected to be 7 mm, so that the clipped lawn surface configuration is made good and sufficient air is drawn into the cutter housing 22.

(3) If the vertical distance 16 between the lower end of the rear portion of the cutter housing 22 and the lower end of the side blade 38 is larger, grass clippings in the cutter housing 22 and air drawn into the cutter housing 22 is less liable to leak out of the cutter housing 22. However, if the dimension 16 were too large, the clipped lawn surface would become irregular. In the illustrated embodiment, the distance 16 is selected to be 6 mm, so that the leakage of grass clippings and air is prevented and the clipped lawn surface is rendered even.

Figure 10A:
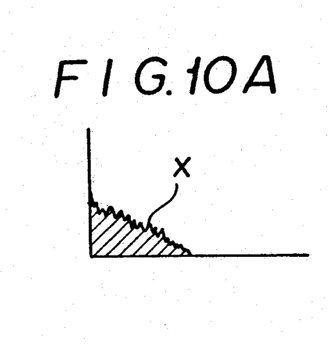
FIGS. 10A and 10b are diagrams showing lawn grass left uncut on the lefthand side of the cutter housing.
Figure 10B:
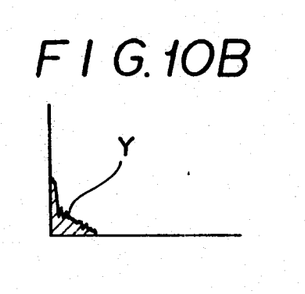

(4) The gap between the upstream side blade 38 and the rear panel 22c, the side panel 22, the first corner 22e, and the front panel 22a is progressively greater in the downstream direction so that the gap is scroll-shaped. This gap configuration is effective to make the clipped lawn surface even. FIG. 10A shows lawn grass X which remains uncut on the lefthand side of the cutter housing when both the dimensions 18, 19 are 5 mm. FIG. 10B shows lawn grass Y which remains uncut on the lefthand side of the cutter housing when the dimension 18 is 5 mm and the dimension 19 is 21 mm according to the illustrated embodiment of the present invention. It is apparent from FIGS. 10A and 10B that the clipped lawn surface is finished better when $18 = 5$ mm and $19 = 21$ mm.

(5) Inasmuch as the distances 110, 111, 112 between the upstream side blade 38, the center blade 37, the downstream side blade 39 and the front panel 22a are progressively greater in the downstream direction, any grass which remains uncut on the righthand side (side blade 39) of the cutter housing 22 is reduced, and the clipped lawn surface is neatly finished.

Figure 11A:
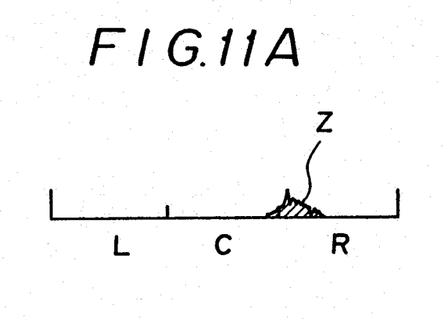
FIGS. 11A and 11B are diagrams showing lawn grass left uncut on the righthand side of the cutter housing.
Figure 11B:
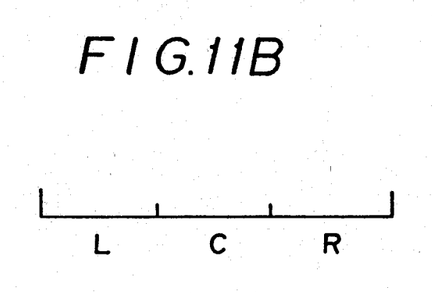

FIG. 11 A shows lawn grass Z which remains uncut on the righthand side (side blade 39) of the cutter housing when all the dimensions 110, 111, 112 are 80 mm. FIG. 11B shows no lawn grass left uncut when the dimension 110 is 68 mm, the dimension 111 is 76 mm, and the dimension 112 is 110 mm according to the illustrated embodiment. Therefore, the clipped lawn surface is better when 110=68 mm, 111=76 mm, and 112=110 mm.

With 110=68 mm, 111=76 mm, and 112=110 mm rather than 110=111=112=80 mm, the amount of grass clippings which are blown from between the center blade 37 and the downstream side blade 39 downwardly of the cutter housing 22 is greatly reduced, and the flow of grass clippings becomes smooth.

Since the distances 110, 111, 112 between the upstream side blade 38, the center side blade 37, the downstream side blade 39 and the front panel 22a are progressively greater in the downstream direction, the angle through which grass clippings discharged from the grass clipping discharge outlet 23 are scattered is increased.

Figure 12A:
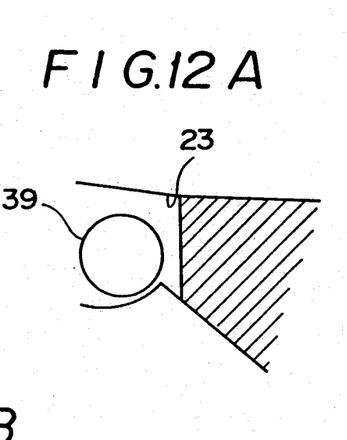
FIGS. 12A and 12B are diagrams showing areas in which grass clippings are scattered laterally of the lawn mower.
Figure 12B:
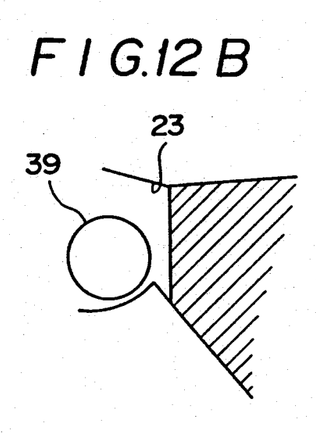

FIG. 12A shows the angle through which grass clippings are scattered when all the dimensions 10, 111, 112 are 80 mm. FIG. 12B illustrates the angle through which grass clippings are scattered when the dimension 110 is 68 mm, the dimension 111 is 76 mm, and the dimension 112 is 110 mm. Comparison of FIGS. 12A and 12B indicates that the angle through which grass clippings are scattered is larger with 110=68 mm, 111=76 mm, and 112=110 mm according to the illustrated embodiment.

(6) Because the discharge adapter 25 is progressively wider outwardly (i.e., in the downstream direction), the angle through which grass clippings are scattered when they are discharged from the discharge adapter 25 is increased.

(7) As the rotational speed of the downstream side blade 39 near the grass clipping discharge outlet 23 is about 10% higher than the rotational speed of the center blade 37 and the upstream side blade 38, grass clippings are discharged with large energy and scattered over a large distance.

(8) In order to reduce the power required to clip lawn grass, the center blade 37 and the side blades 38, 39 are tilted forwardly at about 1°. Furthermore, the center blade 37 is higher than the side blades 38, 39 by about 2.5 mm (=blade length×sin 1°). Therefore, as shown in FIG. 7, the front tip 37a of the center blade 37 is vertically positioned at the same height of the front tips 38a, 39a of the side blades 38, 39, with the result that lawn grass can be clipped to a uniform height.

Figure 13A:
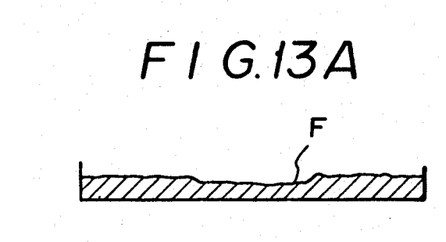
FIGS. 13A and 13B are cross-sectional views of clipped lawn surfaces.
Figure 13B:
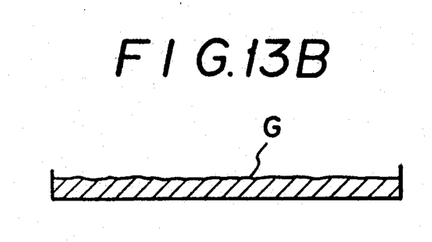

FIG. 13A shows a clipped lawn surface F produced when the center blade 37 and the side blades 38, 39 are tilted forwardly without height difference therebetween. Since the front tip 37a of the center blade 37 is positioned 39, the clipped lawn surface is lower at center than surrounding portions, and hence is irregular. FIG. 13B shows a clipped lawn surface G produced when the center blade 37 is higher than the side blades 38, 39 by about 2.5 mm (=blade length×sin 1°) and the blades 37, 38, 39 are tilted forwardly according to the illustrated embodiment. As shown in FIG. 13B, when the blades 37, 38, 39 are forwardly tilted and vertically positioned relatively to each other according to the embodiment, the clipped lawn surface is of uniform height.

(9) The flange 60 which continuously extends from the point A in FIG. 5 to the grass clipping discharge outlet 23 and is attached to the lower end of the cutter housing 22, is effective to prevent grass clippings from dropping out of the cutter housing 22.

With the present invention, as described above, the distance 14 between the elevated panel portion 35a defining the grass clipping discharge passage 35 and the lower ends of the cutter blades 37, 38, 39 is selected to be in the range of from 120 mm to 140 mm, and the elevated panel portion 35a is higher than the upper panel 22g of the cutter housing 22 by a distance ranging from 0 mm to 20 mm. These dimensional features allow the lawn mower 100 to clip lawn grass to a uniform level for a neat lawn surface, and to discharge grass clippings effectively and efficiently.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. A cutter and housing assembly for a lawn mower, comprising:
   means for cutting including a plurality of blades dispersed dispersely as viewed in plan; and
   a cutter housing accommodating said cutting means therein and having at least an upper panel and a side grass clipping discharge outlet;
   said upper panel having an elevated panel portion which defines within said cutter housing a grass clipping discharge passage positioned forwardly, with respect to the lawn mower, of paths of rotational motion of said blades and contiguous to said grass clipping discharge outlet;
   said elevated panel portion being spaced from lower ends of said blades by a distance ranging from 120 mm to 140 mm, and said elevated panel portion being higher than said upper panel by a distance ranging from 1 mm to 20 mm.

2. A cutter and housing assembly according to claim 1, wherein said grass clipping discharge passage has a width along a longitudinal axis of the lawn mower, said width being progressively greater toward said grass clipping discharge outlet in a downstream direction along which grass clippings are discharged through said grass clipping discharge passage.

3. A cutter and housing assembly according to claim 2, wherein said blades include a single center blade and two side blades disposed one on each side of said center blade.

4. A cutter and housing assembly according to claim 3, wherein said cutter housing also includes a front panel projecting forwardly at a central portion thereof, said grass clipping discharge passage angularly projecting forwardly at a central portion thereof, and said center blade is positioned forwardly of said side blades.

5. A cutter and housing assembly according to claim 1, wherein said cutter housing has a rear panel, a side panel joined to said rear panel, and a front panel joined to said side panel, and one of said side blades which is positioned remotely from said grass clipping discharge outlet has a path of rotational motion which is spaced from said rear panel, said side panel, and said front panel by respective distances which are progressively larger along the direction in which said one side blade rotates, whereby an upstream portion of said grass clipping discharge passage around said one side blade is of a scroll shape.

6. A cutter and housing assembly according to claim 3, wherein one of said side blades which is positioned closely to said grass clipping discharge outlet is rotatable at a speed higher than speeds at which the other side blade and said center blade rotate.

7. A cutter and housing assembly according to claim 6, wherein said speeds at which the other side blade and said center blade rotate are substantially the same as each other.

8. A cutter and housing assembly according to claim 3, wherein said center blade is higher in position than said side blades, and said cutter housing is tilted forwardly.

9. A cutter and housing assembly according to claim 1, wherein said cutter housing has a front panel, a rear panel, and a discharge adapter mounted in said side grass clipping discharge outlet, said discharge adapter having a front wall inclined to said front panel at a first angle and a rear wall inclined to said rear panel at a second angle greater than said first angle, and wherein said front and rear walls of said discharge adapter are spaced from each other by a distance which is progressively greater in an outward direction away from said grass clipping discharge outlet.

10. A cutter and housing assembly according to claim 1, wherein said cutter housing has a portion covering at least side and rear portions of one of said center and side blades which is positioned most remotely from said grass clipping discharge outlet, said cutter housing further including a flange extending from a lower edge of said portion of the cutter housing into the cutter housing.

11. A cutter and housing assembly for a lawn mower, comprising:
  means for cutting including a single center blade and two side blades disposed one on each side of said center blade; and
  a cutter housing accommodating said cutting means therein and having at least an upper panel and a side grass clipping discharge outlet;
  said upper panel having an elevated panel portion which defines within said cutter housing a grass clipping discharge passage positioned forwardly, with respect to the lawn mower, of paths of rotational motion of said blades and contiguous to said grass clipping discharge outlet;
  said cutter housing having a rear panel, a side panel joined to said rear panel, and a front panel joined to said side panel, and wherein one of said side blades which is positioned remotely from said grass clippings discharge outlet has a path of rotational motion which is spaced from said rear panel, said side panel, and said front panel by respective distances which are progressively larger along the direction in which said one side blade rotates, whereby an upstream portion of said grass clipping discharge passage around said one side blade is of a scroll shape.

12. A cutter and housing assembly according to claim 11, wherein said elevated panel portion is spaced from mower ends of said blades by a distance ranging from 120 mm to 140 mm, and said elevated panel portion is higher than said upper panel by a distance ranging from 1 mm to 20 mm.

13. A cutter and housing assembly according to claim 12, wherein said grass clipping discharge passage has a width along a longitudinal axis of the lawn mower, said width being progressively greater toward said grass clipping discharge outlet in a downstream direction along which grass clippings are discharged through said grass clipping discharge passage.

14. A cutter and housing assembly according to claim 13, wherein said cutter housing also includes a front panel projecting forwardly at a central portion thereof, said grass clipping discharge passage angularly projecting forwardly at a central portion thereof, and said center blade is positioned forwardly of said side blades.

15. A cutter and housing assembly according to claim 11, wherein one of said side blades which is positioned closely to said grass clipping discharge outlet is rotatable at a speed higher than speeds at which the other side blade and said center blade rotate.

16. A cutter and housing assembly according to claim 15, wherein said speeds at which the other side blade and said center blade rotate are substantially the same as each other.

17. A cutter and housing assembly according to claim 11, wherein said center blade is higher in position than said side blades, and said cutter housing is tilted forwardly.

18. A cutter and housing assembly according to claim 11, wherein said cutter housing has a front panel, a rear panel, and a discharge adapter mounted in said side grass clipping discharge outlet, said discharge adapter having a front wall inclined to said front panel at a first angle and a rear wall inclined to said rear panel at a second angle greater than said first angle, and wherein said front and rear walls of said discharge adapter are spaced from each other by a distance which is progressively greater in an outward direction away from said grass clipping discharge outlet.

19. A cutter and housing assembly according to claim 11, wherein said cutter housing has a portion covering at least side and rear portions of one of said center and side blades which is positioned most remotely from said grass clipping discharge outlet, said cutter housing further including a flange extending from a lower edge of said portion of the cutter housing into the cutter housing.

20. A cutter and housing assembly for a lawn mower, comprising:
  means for cutting including a single center blade and two side blades disposed one on each side of said center blade, and said center and side blades being disposed dispersely as viewed in plan; and
  a cutter housing accommodating said cutting means therein and having at least an upper panel and a side grass clipping discharge outlet;
  said upper panel having an elevated panel portion which defines within said cutter housing a grass clipping discharge passage positioned forwardly, with respect to the lawn mower, of paths of rotational motion of said blades and contiguous to said grass clipping discharge outlet;
  one of said side blades which is positioned closely to said grass clipping discharge outlet, being rotatable at a speed higher than speeds at which the other side blade and said center blade rotate; and
  said speeds at which said other side blade and said center blade rotate are substantially the same as each other.

21. A cutter and housing assembly according to claim 20, wherein said elevated panel portion is spaced from lower ends of said blades by a distance ranging from 120 mm to 140 mm, and said elevated panel portion is higher than said upper panel by a distance ranging from 1 mm to 20 mm.

22. A cutter and housing assembly according to claim 21, wherein said grass clipping discharge passage has a width along a longitudinal axis of the lawn mower, said width being progressively greater toward said grass clipping discharge outlet in a downstream direction along which grass clippings are discharged through said grass clipping discharge passage.

23. A cutter and housing assembly according to claim 22, wherein said cutter housing also includes a front panel projecting forwardly at a central portion thereof, said grass clipping discharge passage angularly projecting forwardly at a central portion thereof, and said center blade is positioned forwardly of said side blades.

24. A cutter and housing assembly according to claim 20, wherein said cutter housing has a rear panel, a side panel joined to said rear panel, and a front panel joined to said side panel, and said side blade which is positioned remotely from said grass clipping discharge outlet has a path of rotational motion which is spaced from said rear panel, said side panel, and said front panel by respective distances which are progressively larger along the direction in which said one side blade rotates, whereby an upstream portion of said grass clipping discharge passage around said one side blade is of a scroll shape.

25. A cutter and housing assembly according to claim 20, wherein said center blade is higher in position than said side blades, and said cutter housing is tilted forwardly.

26. A cutter and housing assembly according to claim 20, wherein said cutter housing has a front panel, a rear panel, and a discharge adapter mounted in said side grass clipping discharge outlet, said discharge adapter having a front wall inclined to said front panel at a first angle and a rear wall inclined to said rear panel at a second angle greater than said first angle, and wherein said front and rear walls of said discharge adapter are spaced from each other by a distance which is progressively greater in an outward direction away from said grass clipping discharge outlet.

27. A cutter and housing assembly according to claim 20, wherein said cutter housing has a portion covering at least side and rear portions of one of said center and side blades which is positioned most remotely from said grass clipping discharge outlet, said cutter housing further including a flange extending from a lower edge of said portion of the cutter housing into the cutter housing.

28. A cutter and housing assembly for a lawn mower, comprising:
    means for cutting including a single center blade and two side blades disposed one on each side of said center blade, and all said blades being disposed dispersely as viewed in plan;
    a cutter housing accommodating said cutting means therein and having at least an upper panel and a side grass clipping discharge outlet;
    said upper panel having an elevated panel portion which defines within said cutter housing a grass clipping discharge passage positioned forwardly, with respect to lawn mower, of paths of rotational motion of said blades and contiguous to said grass clipping discharge outlet;
    one of said side blades which is positioned closely to said grass clipping discharge outlet being rotatable at a speed higher than speeds at which the other side blade and said center blade rotate;
    said elevated panel portion being spaced from lower ends of said blades by a distance ranging from 120 mm to 140 mm, and said elevated panel portion being higher than said upper panel by a distance ranging from 1 mm to 20 mm; and
    said grass clipping discharge passage having a width along a longitudinal axis of the lawn mower, said width being progressively greater toward said grass clipping discharge outlet in a downstream direction along which grass clippings are discharged through said grass clipping discharge passage.

29. A cutter and housing assembly for a lawn mower, comprising:
    means for cutting including a plurality of blades disposed dispersely as viewed in plan;
    a cutter housing accommodating said cutting means therein and having at least an upper panel and a side grass clipping discharge outlet;
    said upper panel having an elevated panel portion which defines within said cutter housing a grass clipping discharge passage positioned forwardly, with respect to the lawn mower, of paths rotational motion of said blades and contiguous to said grass clipping discharge outlet;
    one of said blades which is positioned closely to said grass clipping discharge outlet being rotatable at a speed higher than speeds at which the other blades rotate; and
    said cutter housing having a rear panel, a side panel joined to said rear panel, and a front panel joined to said side panel, and one of said blades which is positioned remotely from said grass clipping discharge outlet having a path of rotational motion which is spaced from said rear panel, said side panel, and said front panel, by respective distances which are progressively larger along the direction in which said one blade rotates, whereby an upstream portion of said grass clipping discharge passage around said one blade is of a scroll shaped.

* * * * *

UNITED STATES PATENT AND TRADEMARK OFFICE
CERTIFICATE OF CORRECTION

PATENT NO. : 5,251,430

DATED : October 12, 1993

INVENTOR(S) : Matsumoto et al.

It is certified that error appears in the above-indentified patent and that said Letters Patent is hereby corrected as shown below:

TITLE PAGE

In the section entitled "References Cited", please change "4,771,077" to --4,711,077--.

Column 2, line 9, change "bade" to --blade--;
Column 2, line 23, delete "side";
Column 2, line 25, delete "being";
Column 2, line 53, change "10b" to --10B--.

Column 4, line 57, change "S3" to --53--.

Column 5, line 19, change "while" to -- whole--.

Column 6, line 65, change "11 A" to --11A--.

Column 7, line 19, change "10" to --110--;
Column 7, line 53, after "positioned" insert --lower than the front tips 38a, 39a of the side blades 38,--.

Column 9, line 61, (claim 12, line 3), change "mower" to --lower--.

Column 10, line 56 (claim 20, line 14), change "tion al" to --tional--.

UNITED STATES PATENT AND TRADEMARK OFFICE
CERTIFICATE OF CORRECTION

PATENT NO. : 5,251,430
DATED : October 19, 1993
INVENTOR(S) : Matsumoto et al.

It is certified that error appears in the above-indentified patent and that said Letters Patent is hereby corrected as shown below:

Column 10, line 56 (claim 20, line 14), change "tion al" to --tional--.

Signed and Sealed this

Twenty-ninth Day of March, 1994

Attest:

BRUCE LEHMAN

*Attesting Officer*      *Commissioner of Patents and Trademarks*